No. 837,050. PATENTED NOV. 27, 1906.
W. H. GARNETT.
SEAT FOR AUTOMOBILES.
APPLICATION FILED MAY 29, 1906.
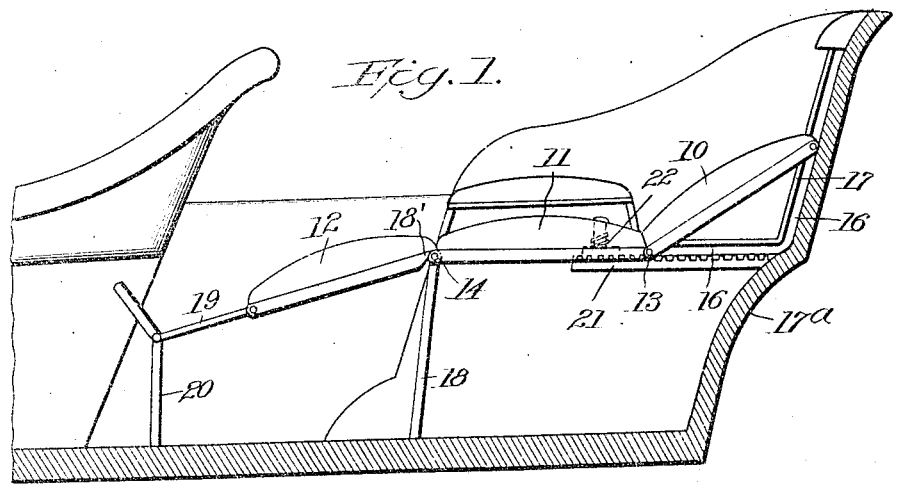
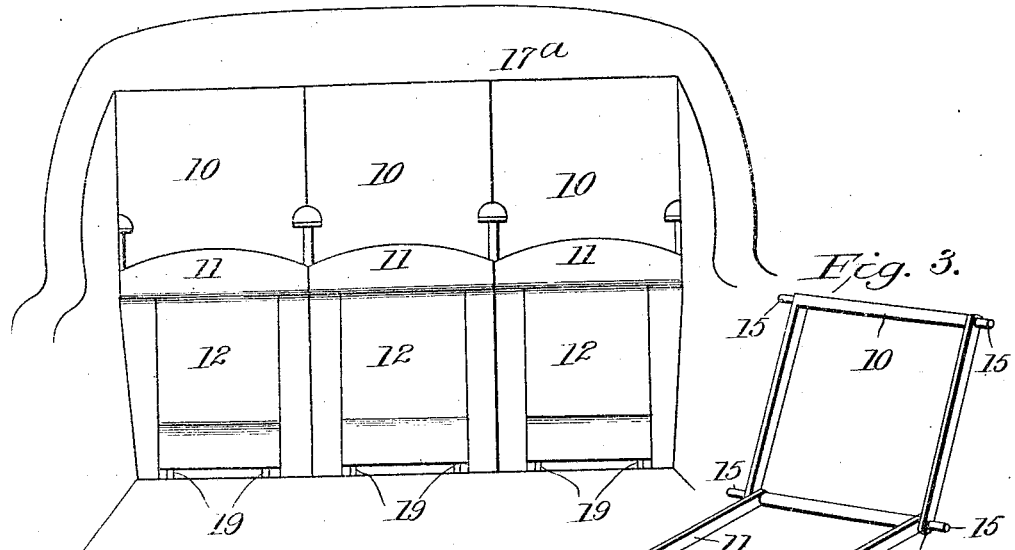
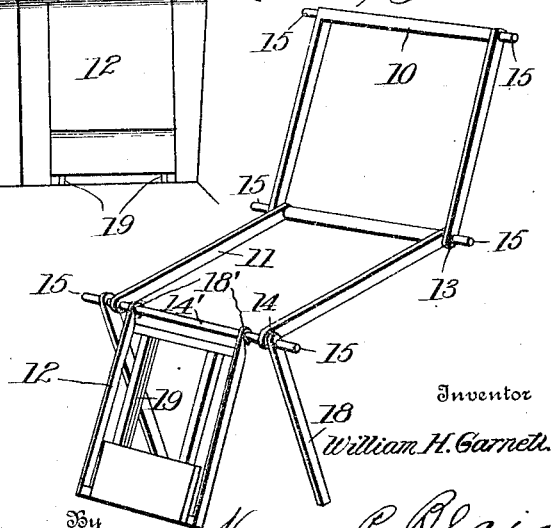
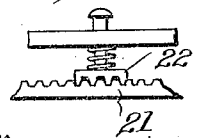
Witnesses
Inventor
William H. Garnett.
By Henry P. Blair
Attorney

UNITED STATES PATENT OFFICE.

WILLIAM H. GARNETT, OF KANSAS CITY, MISSOURI.

SEAT FOR AUTOMOBILES.

No. 837,050.

Specification of Letters Patent.

Patented Nov. 27, 1906.

Application filed May 29, 1906. Serial No. 319,246.

*To all whom it may concern:*

Be it known that I, WILLIAM H. GARNETT, a citizen of the United States, residing at Kansas City, in the county of Jackson and State of Missouri, have invented new and useful Improvements in Automobile-Seats, of which the following is a specification.

This invention relates to certain new and useful improvements in seats for automobiles.

The object of the invention is to provide a seat for automobiles which can be extended to form a reclining seat and which when not desired for this purpose can be compactly folded up to form one of the usual seats of the vehicle.

A further object is to provide simple and efficient means for guiding the parts while being extended or folded up.

A further object is to provide efficient means for locking the seat in any adjusted position.

The invention will be hereinafter fully set forth, and particularly pointed out in the claims.

In the accompanying drawings, Figure 1 is a sectional view of an automobile-body, illustrating my improved extension-seat. Fig. 2 is a front view of the seat folded back into normal position. Fig. 3 is a detail view of the seat. Fig. 4 is a detail illustrating the locking device.

Referring to the drawings, my improved reclining or extension seat is formed of three principal parts—to wit, a back 10, seat 11, and leg-rest 12, hinged to each other at 13 and 14, respectively. Each pivot or hinge is provided with an extension 15, working in guide-grooves 16, whereby the seat parts are guided in their movement while being extended or folded back. The guide-grooves are preferably formed in rods or strips 17, supported by the seat-frame 17ª of the vehicle. The seat when extended, as illustrated in Fig. 1, is supported at one end by the vehicle-frame and at the other end by suitable legs 18. The leg-rest is provided with hooks 18', engaging rod 14', and is also provided with an extension foot-piece mounted on rods 19, which are adjustably mounted in said leg-rest, folding legs 20 being provided for said foot-rest. The seat 11 is also provided with a rack-bar 21, which is normally engaged by a spring-pressed catch 22, whereby said seat is held against movement.

In practice the seat is normally folded, as illustrated in Fig. 2. When it is desired to extend the same, the catch 22 is raised and the seat may then be slid forward. The result of this movement is that the back 10 is guided by grooves 16 into an inclined position. At the same time the legs 20 are moved to a vertical position to support the foot and leg rests, the foot-rest being moved out to the proper adjustment for the person about to use the same. When it is desired to fold the parts into their normal position, the foot-rest is moved inward to the limit of its adjustment and the legs 20 folded thereunder. The catch 22 is then raised, and the seat can then be moved to its normal position, the legs 18 being moved up against the forward portion of the seat-frame of the vehicle. When in this position, the leg-rest may be unhooked to permit access to space beneath seat.

The advantages of my improved automobile-seat are obvious. It will be particularly noted that the same may be readily adjusted to form a reclining seat, and when folded up in its normal position is compact and neat in appearance. It will also be observed that I have provided simple and efficient means for guiding the parts to their adjusted positions and also for locking them securely in their adjusted positions.

I claim as my invention—

1. An automobile-seat comprising a seat-frame having guide-grooves therein, a seat mounted to be guided by said grooves and comprising a seat, back and leg-rest, pivotally connected together, and means for supporting said seat and leg-rest while in an extended condition.

2. An automobile-seat comprising a seat, back and leg-rest pivotally connected together, means for guiding said seat and back into an extended position, and means for supporting said seat and leg-rest while in an extended position.

3. An automobile-seat comprising a seat, back and leg-rest pivotally connected together, the pivots thereof being provided with extensions forming guide-pins, means for guiding said pins as said parts are moved for adjustment, and means for supporting said seat and leg-rest while in an extended position.

4. An automobile-seat comprising a seat, back and leg-rest pivotally connected together, the pivots thereof being provided with extensions forming guide-pins, strips having grooves to guide said pins, and means for supporting said seat and leg-rest while in an extended position.

5. An automobile-seat comprising a seat, back and leg-rest pivotally connected together, means for guiding said seat and leg-rest into an extended position, a foot-rest adjustably mounted in said leg-rest, and folding legs connected to said foot-rest, said seat being also provided with legs.

6. An automobile-seat comprising a seat, back and leg-rest pivotally connected together, means for guiding said parts into an extended position, and means for locking said parts in any adjusted position.

7. An automobile-seat comprising a seat, back and leg-rest pivotally connected together, means for guiding said parts into an extended position, a rack-bar carried by said seat, and a spring-catch normally engaging said rack-bar.

8. An automobile-seat comprising a seat, back and leg-rest pivotally connected together, guide-pins therefor working in guide-grooves, means for supporting said seat and leg-rest while in an extended position, and means for locking said seat in any adjusted position.

In testimony whereof I affix my signature in presence of two subscribing witnesses.

WILLIAM H. GARNETT.

Witnesses:
   ROBERT P. LUKENS,
   WILLIAM ALLBRITAIN.